United States Patent
Myers et al.

(10) Patent No.: US 11,111,980 B1
(45) Date of Patent: Sep. 7, 2021

(54) UNIDIRECTIONAL DAMPING SYSTEM

(71) Applicant: United States of America as represented by the Administrator of NASA, Washington, DC (US)

(72) Inventors: W. Neill Myers, Huntsville, AL (US); Robert E. Berry, Madison, AL (US); Frederick Scott Gant, Huntsville, AL (US); Jeffrey Lee Lindner, Madison, AL (US); John S. Townsend, Union Grove, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 17/217,823

(22) Filed: Mar. 30, 2021

(51) Int. Cl.
*F16F 9/04* (2006.01)
*F16F 15/023* (2006.01)

(52) U.S. Cl.
CPC ........ *F16F 9/0472* (2013.01); *F16F 15/0232* (2013.01); *F16F 2222/126* (2013.01)

(58) Field of Classification Search
CPC ........ F16F 9/0472; F16F 9/049; F16F 9/0418; F16F 15/0232; F16F 2222/126; F16F 2230/32; F16F 2232/08; F16F 2234/02
See application file for complete search history.

(56) References Cited

U.S. PATENT DOCUMENTS

| | | | |
|---|---|---|---|
| 3,037,765 A * | 6/1962 | Francis | F16F 9/049 267/64.14 |
| 4,760,996 A | 8/1988 | Davis | |
| 4,825,681 A * | 5/1989 | Smedberg | B21D 24/02 100/259 |
| 5,332,070 A | 7/1994 | Davis et al. | |
| 7,182,188 B2 | 2/2007 | Ruebsamen et al. | |
| 9,254,727 B2 * | 2/2016 | Moulik | F16F 9/049 |
| 9,587,702 B2 | 3/2017 | Witwer et al. | |
| 2005/0217954 A1 | 10/2005 | Hindle et al. | |
| 2015/0226282 A1 * | 8/2015 | Hindle | F16F 9/18 188/297 |

FOREIGN PATENT DOCUMENTS

| | | | | |
|---|---|---|---|---|
| GB | 345548 A * | 3/1931 | | F16F 9/049 |
| JP | 59137636 A * | 8/1984 | | F16F 9/049 |

* cited by examiner

*Primary Examiner* — Xuan Lan Nguyen
(74) *Attorney, Agent, or Firm* — James J. McGroary; Helen M. Galus

(57) ABSTRACT

A unidirectional damping system includes a shaft and unidirectional damping modules. Each module is fixedly coupled to the shaft. Each module includes a fluid-filled variable-volume chamber and spring(s). The chamber has at least one port through which fluid flows based on changes in volume of the chamber wherein, when the shaft is adapted to have a unidirectional force applied thereto, the chamber decreases in volume. The spring(s) is coupled to the chamber for increasing volume of the chamber when the unidirectional force is not applied to the shaft. A fluid-filled spacer chamber is coupled between adjacent modules and is uncoupled from the shaft. The spacer chamber includes at least one venting port through which fluid flows based on pressure in the spacer chamber.

16 Claims, 2 Drawing Sheets

UNIDIRECTIONAL DAMPING SYSTEM

ORIGIN OF THE INVENTION

Figure 1:
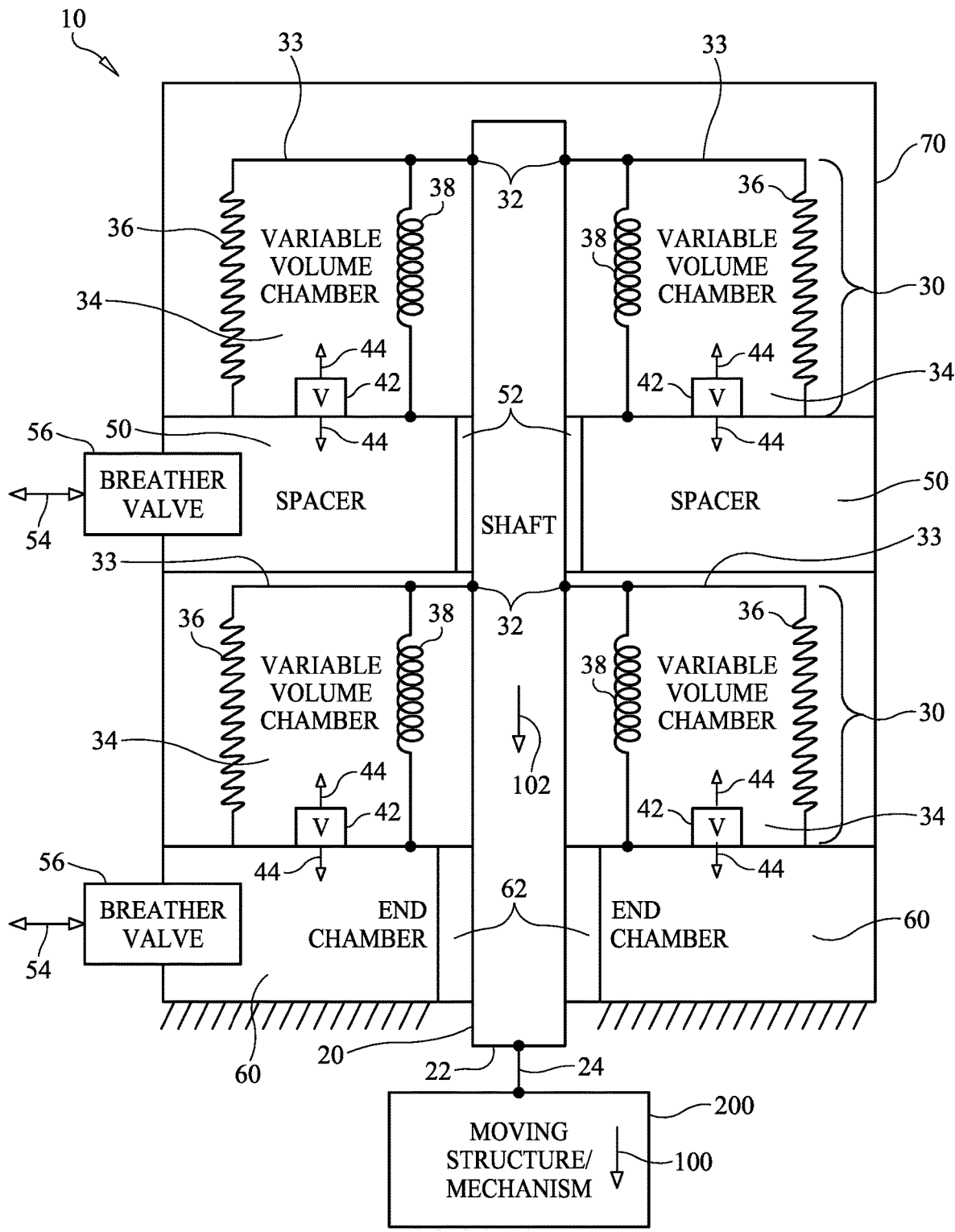

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore.

BACKGROUND OF THE INVENTION

1. Field of the Invention

This invention relates to damping systems. More specifically, the invention is a damping system providing damping forces in a single linear direction.

2. Description of the Related Art

A variety of structures or mechanisms are susceptible to dynamic deflection and/or motion behavior that can produce undesirable results. While conventional springs and dampers can be used to control structural motion in some applications, they generally do not have the ability to generate linear damping forces and/or generally are not easily modified to adapt to changing motion amplitude.

SUMMARY OF THE INVENTION

Accordingly, it is an object of the present invention to provide a unidirectional damping system.

Another object of the present invention is to provide a damping system that can be configured to provide adjustable amounts of damping forces in a linear direction.

Other objects and advantages of the present invention will become more obvious hereinafter in the specification and drawings.

In accordance with the present invention, a unidirectional damping system includes a shaft and a plurality of unidirectional damping modules. Each module is fixedly coupled to the shaft at a unique longitudinal location thereof. Each module includes a fluid-filled variable-volume chamber and at least one spring. The chamber has at least one port through which fluid flows based on changes in volume of the chamber wherein, when the shaft is adapted to have a unidirectional force applied thereto, the chamber decreases in volume. The spring(s) is coupled to the chamber for increasing volume of the chamber when the unidirectional force is not applied to the shaft. A fluid-filled spacer chamber is coupled between adjacent modules and is uncoupled from the shaft. The spacer chamber includes at least one venting port through which fluid flows based on pressure in the spacer chamber.

BRIEF DESCRIPTION OF THE DRAWING(S)

Figure 2:
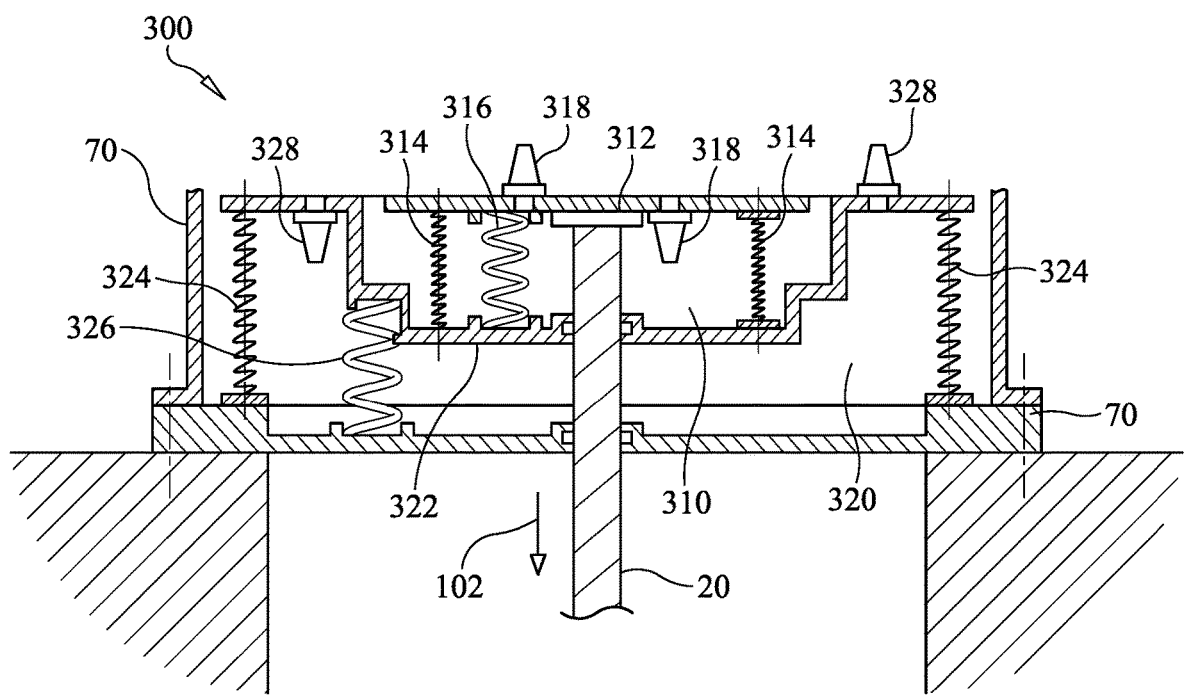

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic view of a unidirectional damping system in accordance with an embodiment of the present invention; and FIG. 2 is a cross-sectional view of an exemplary embodiment of a nested-chamber damping module in accordance with another embodiment of the present invention.

DESCRIPTION OF THE PREFERRED EMBODIMENT(S)

Referring now to the drawings and more particularly to FIG. 1, a unidirectional damping system in accordance with the present invention is shown schematically and is referenced generally by numeral 10. As will be explained further below, damping system 10 can generate damping forces in a linear direction to counteract motion of a structure or mechanism 200 where such motion is indicated in FIG. 1 by an arrow 100. The type and/or size of structure/mechanism 200 are not limitations of the present invention.

Damping system 10 includes a shaft 20 that, in general, is coupled to structure/mechanism 200 that is subject to motion along a direction indicated by arrow 100. One end 22 of shaft 20 can be directly coupled to structure/mechanism 200 or indirectly coupled to structure/mechanism 200 through a linkage 24. Such coupling transfers motion 100 to shaft 20 to produce corresponding linear motion 102 of shaft 20 along the longitudinal length of shaft 20. Shaft 20 is axially rigid and can be a one-piece or multiple-piece structure without departing from the scope of the present invention.

Shaft 20 extends substantially along the length of damping system 10 to deliver corresponding motion 102 to each of multiple damping modules 30 distributed along the length of shaft 20. In the illustrated embodiment, two-damping modules 30 are shown. However, it is to be understood that additional modules 30 can be provided along the length of shaft 20 without departing from the scope of the present invention. The ability to add more damping modules 30, as well as segments of shaft 20 as needed, allows damping system 10 to be configured and adapted to a variety of applications requiring different amounts of damping forces.

Each of damping modules 30 is fixedly and rigidly coupled to shaft 20 at a unique location along the length thereof as indicated at 32 such that motion 102 is transferred to each of damping modules 30. In the illustrated embodiment, each of modules 30 is disposed annularly about shaft 20 with shaft 20 being centrally disposed in each module 30. Each of damping modules 30 includes a variable-volume chamber 34 filled with a fluid (e.g., a gas or, in some cases, a liquid). Chambers 34 are fluidically isolated from one another. Each chamber's variable volume capability can be achieved in a variety of ways without departing from the scope of the present invention. By way of a non-limiting example, side walls 36 of each chamber 34 can be constructed for flexibility using bellows, rolling diaphragms, etc.

During motion 102 of shaft 20, each chamber 34 experiences compression (i.e., a reduction in volume). During a chamber's compression, fluid in the chamber is pushed therefrom. However, when a chamber experiences extension, additional fluid is pulled into the chamber. Such fluid movement into or out of each chamber 34 is indicated by arrows 44. Fluid movements 44 can be controlled by valved ports that can be realized by one or more valves ("V") 42 mounted in a wall of chamber 34. Valves 42 can be realized by multiple one-way valves, single two-way variable-aperture valve as disclosed in U.S. Pat. No. 8,939,178, etc., the choice of which is not a limitation of the present invention.

Regardless of the type(s) of valves used, fluid movements 44 experience resistance as they occur.

Adjacent damping modules 30 are separated and coupled to one another by a fixed-volume spacer chamber 50 that, in the illustrated embodiment, is also disposed annularly about shaft 20 and fluidically sealed with respect thereto by an annular seal 52. However, spacer chamber 50 is uncoupled from shaft 20 such that shaft 20 can experience its motion 102 relative to spacer chamber 50 as shaft 20 moves axially through seal 52. The first damping module 30 is coupled to an end spacer 60 that is configured similar to spacer chamber 50 such that it is sealed to shaft 20 by an annular seal 62 that permits axial movement of shaft 20. Chambers 50 and 60 are filled with the same fluid used to fill chambers 34, and serves as a fluid reservoir for receiving and supplying the fluid to chambers 34 when they experience compression and extension. To prevent fluid movements 44 from being deadheaded by pressure build-up or pressure drops in chambers 50 and 60, the chambers can be vented based on the pressure therein as indicated by two-headed arrow 54 where such venting can be regulated by, for example, breather valves 56. Breather valves 56 can communicate with an ambient environment when the fluid used in damping modules 30 and chambers 50/60 is air.

In operation, motion 102 of shaft 20 (caused by motion 100 of structure/mechanism 200) translates into the above-described compression of chambers 34 and corresponding fluid movements 44 out of chambers 34. When forces applied to shaft 20 causes motion 102 to cease, so does the compression of chamber 34. To restore chambers 34 to their pre-compressed state, one or more springs 38 are disposed in chambers 34 to extend side walls 36 and thereby increase the volume in chambers 34. As this occurs, fluid flows into chambers 34 through valves 42. For the illustrated embodiment where chambers 34 are disposed annularly about shaft 20 with each chamber's side walls 36 being flexible, spring (s) 38 should ideally prevent canting of chamber 34 during compression or extension thereof. To accomplish this, three or more springs 38 can be distributed evenly around chamber 34, e.g., three springs spaced 120° apart, four springs spaced 90° apart, etc.

The resistance encountered by fluid movements 44 (i.e., a phase lag) behind the motion 100 that is to be damped. Damping system 10 can be tuned to an optimum phase lag for a given application to reduce the gain of resonance. Such tuning can be readily achieved by the choice of and/or adjustment of valves 42 controlling fluid movements.

Damping system 10 can be a self-contained system that includes a rigid housing 70 that allows shaft 20 to extend therefrom and experience motion 102. Each damping module 30 includes a rigid plate 33 that is fixed to shaft 20 at 32 such that each plate 33 experiences motion 102 in correspondence with shaft 20. Chambers 50 and 60 can be attached to housing 70 or integrated therewith (as shown) without departing from the scope of the present invention.

As mentioned above, adjustments or tuning of damping forces can be controlled by adding/subtracting modules 30 and/or making adjustments to valves 42. Additionally or alternatively, the damping modules can be realized by a nested-chamber configuration thereof. An exemplary embodiment of a nested-chamber damping module is illustrated in FIG. 2 and is referenced generally by numeral 300.

Module 300 is illustrated within housing 70 and has shaft 20 coupled thereto. Module 300 has two fluid-filled variable-volume chambers 310 and 320 where chamber 310 is nested within chamber 320. Both chambers 310 and 320 are disposed annularly about shaft 20. Chamber 310 has a top plate 312 coupled to shaft 20 for movement therewith, and has flexible side walls 314 coupled to top plate 312 and a top plate 322 of chamber 320. One or more extension-restoration springs 316 are disposed within chamber 310 and are typically distributed evenly about shaft 20 as previously described herein. For clarity of illustration, only one spring 316 is shown in FIG. 2. One or more valves 318 provide for movement of fluid into and out of chamber 310 as described above. Top plate 322 is disposed annularly about shaft 20 but is not coupled thereto such that shaft motion 102 is not imparted to top plate 322. Chamber 320 has flexible side walls 324 coupled to top plate 322 and, to the base of housing 70 in the illustrated example. One or more extension-restoration springs 326 (only one is shown) are disposed within chamber 320 and are typically distributed evenly about shaft 20 as previously described herein. One or more valves 328 provide for movement of fluid into and out of chamber 320.

In operation, when motion 102 initially causes compression of chamber 310, chamber 320 remains unaffected. When chamber 310 has achieved its maximum decrease in volume and motion 102 continues due to a correspondent force being applied to shaft 20, chamber 320 begins to compress owing to its coupling to chamber 310 via top plate 322. As the force associated with motion 102 decreases, springs 326 cause restorative extension of chamber 320. Following full extension of chamber 320 and a continuing decrease in motion 102, springs 316 cause restorative extension of chamber 310.

The advantages of the present invention are numerous. Linear motion is damped by a system that is readily adapted and tuned by adding damping modules, using nested-chamber damping modules, and/or adjusting the fluid movement resistance of the damping modules. Thus, the damping system can readily achieve an adjustable dynamic range that enhances its functionality and value.

Although the invention has been described relative to specific embodiments thereof, there are numerous variations and modifications that will be readily apparent to those skilled in the art in light of the above teachings. For example, the nested-chamber embodiment can be modified to provide damping in two opposing linear directions by placing two nested-chamber modules "back-to-back" and removing the internal springs therefrom. It is therefore to be understood that, within the scope of the appended claims, the invention may be practiced other than as specifically described.

What is claimed as new and desired to be secured by Letters Patent of the United States is:

1. A unidirectional damping system, comprising:
   a shaft;
   a plurality of unidirectional damping modules, each of said modules fixedly coupled to said shaft at a unique longitudinal location thereof, each of said modules including
   a fluid-filled variable-volume chamber including at least one port through which fluid flows based on changes in volume of said chamber wherein, when said shaft is adapted to have a unidirectional force applied thereto, said chamber decreases in volume, and
   at least one spring coupled to said chamber for increasing volume of said chamber when the unidirectional force is not applied to said shaft; and
   a fluid-filled spacer chamber coupled between adjacent ones of said modules and uncoupled from said shaft, said spacer chamber including at least one venting port through which fluid flows based on pressure in said spacer chamber.

2. A system as in claim 1, further comprising a valve disposed in each said port of said chamber and said venting port of said spacer chamber.

3. A system as in claim 1, wherein said shaft is centrally disposed in each of said modules.

4. A system as in claim 1, wherein each of said modules and each said spacer chamber are disposed annularly about said shaft.

5. A system as in claim 1, wherein each said chamber includes flexible side walls.

6. A system as in claim 1, wherein a fluid filling said chamber and said spacer chamber comprises a gas.

7. A unidirectional damping system, comprising:
- a rigid housing;
- a shaft disposed in said housing and extending on one end thereof from said housing, said one end adapted to be coupled to a structure subject to movement;
- a plurality of unidirectional damping modules disposed in said housing, each of said modules fixedly coupled to said shaft at a unique longitudinal location thereof, each of said modules including
- a rigid plate fixed to said shaft at said unique longitudinal location associated with one of said modules,
- a fluid-filled variable-volume chamber coupled to said plate, said chamber including at least one port through which fluid flows based on changes in volume of said first chamber wherein, when said shaft is adapted to have a unidirectional force applied thereto, said chamber decreases in volume, and
- a plurality of springs coupled to and disposed within said chamber for increasing volume of said chamber when the unidirectional force is not applied to said shaft;
- said housing defining a fixed-volume spacing chamber between adjacent ones of said modules; and
- a breather valve disposed in said housing and in fluid communication with each said spacing chamber.

8. A system as in claim 7, further comprising a valve disposed in each said port of said chamber.

9. A system as in claim 7, wherein said shaft is centrally disposed in each of said modules.

10. A system as in claim 7, wherein each of said modules and each said spacing chamber is disposed annularly about said shaft.

11. A system as in claim 7, wherein each said chamber includes flexible side walls.

12. A system as in claim 7, wherein a fluid filling said chamber comprises a gas.

13. A unidirectional damping system, comprising:
- a shaft;
- a plurality of unidirectional damping modules, each of said modules disposed annularly about said shaft wherein said shaft is centrally disposed in each of said modules, each of said modules fixedly coupled to said shaft at a unique longitudinal location thereof, each of said modules including
- a rigid plate fixed to said shaft at said unique longitudinal location associated with one of said modules,
- a fluid-filled variable-volume chamber including at least one port through which fluid flows based on changes in volume of said chamber wherein, when said shaft is adapted to have a unidirectional force applied thereto, said chamber decreases in volume, and
- at least one spring coupled to and disposed within said chamber for increasing volume of said chamber when the unidirectional force is not applied to said shaft; and
- a fluid-filled spacer chamber coupled between adjacent ones of said modules and uncoupled from said shaft, said spacer chamber including at least one venting port through which fluid flows based on pressure in said spacer chamber.

14. A system as in claim 13, further comprising a valve disposed in each said port of said chamber and said venting port of said spacer chamber.

15. A system as in claim 13, wherein each said chamber includes flexible side walls.

16. A system as in claim 13, wherein a fluid filling said chamber and said spacer chamber comprises a gas.

\* \* \* \* \*